United States Patent
Chang et al.

(10) Patent No.: US 9,123,216 B2
(45) Date of Patent: Sep. 1, 2015

(54) DETECTION OF OBJECTS BY ELECTRONIC GLOVE

(71) Applicant: HON HAI PRECISION INDUSTRY CO., LTD., New Taipei (TW)

(72) Inventors: Ting-She Chang, New Taipei (TW); Tsung-Jen Chuang, New Taipei (TW); Shih-Fang Wong, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 47 days.

(21) Appl. No.: 13/901,608

(22) Filed: May 24, 2013

(65) Prior Publication Data

US 2013/0314227 A1 Nov. 28, 2013

(30) Foreign Application Priority Data

May 28, 2012 (CN) .......................... 2012 1 1683196

(51) Int. Cl.
*G08B 1/08* (2006.01)
*G08B 7/00* (2006.01)
*G06F 3/01* (2006.01)

(52) U.S. Cl.
CPC *G08B 7/00* (2013.01); *G06F 3/014* (2013.01); *G06F 3/016* (2013.01)

(58) Field of Classification Search
CPC .. A61B 5/1112; A61B 5/0008; A61B 5/6801; A61B 5/6802; A61B 5/6803; A61B 5/6805; G08B 21/0275; G08B 21/0446; G08B 13/1427; G08B 25/016; G08B 19/00; H04M 2250/12; G01K 1/024

USPC ............... 340/500, 539.1, 539.13, 539.15, 340/539.27, 539.28, 539.32, 540, 573.1; 2/158, 159, 161.1, 161.2, 161.4, 167, 2/168; 701/468, 469, 519; 342/357.23, 342/350; 345/156

See application file for complete search history.

(56) References Cited

U.S. PATENT DOCUMENTS

| | | | |
|---|---|---|---|
| 7,207,902 B1 * | 4/2007 | Hamlin | 473/353 |
| 7,592,918 B2 * | 9/2009 | Karr | 340/572.1 |
| 2007/0279237 A1 * | 12/2007 | Julian et al. | 340/686.1 |
| 2008/0062120 A1 * | 3/2008 | Wheeler et al. | 345/156 |
| 2010/0102958 A1 * | 4/2010 | Chen et al. | 340/539.32 |
| 2011/0043496 A1 * | 2/2011 | Ray Avalani | 345/204 |
| 2011/0234397 A1 * | 9/2011 | Fetzer et al. | 340/539.13 |

* cited by examiner

*Primary Examiner* — George Bugg
*Assistant Examiner* — Edny Labbees
(74) *Attorney, Agent, or Firm* — Novak Druce Connolly Bove + Quigg LLP

(57) ABSTRACT

An electronic glove communicates with an electronic device and has a positioning unit, a microcontroller, and an indicating component. The indicating component may be a heating component or a visual indicating component. The positioning unit detects coordinates of the electronic glove and the electronic device sends its own coordinates wirelessly to the electronic glove. The microcontroller calculates a distance between the electronic device and the electronic glove. The microcontroller controls the indicating component to generate different signals (of either heat or light) according to any change in the distance, to guide a user to move towards the precise location of the electronic device.

10 Claims, 4 Drawing Sheets

DETECTION OF OBJECTS BY ELECTRONIC GLOVE

BACKGROUND

1. Technical Field

Embodiments of the present disclosure relate to electronic gloves, and particularly to, an electronic glove that thermally indicates the presence of an electronic device.

2. Description of Related Art

Some people may forget where their phones, PDAs, or other electronic devices are put away. Thus, they may lose a lot of time to search for their devices, which is inconvenient. Therefore, there is a room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
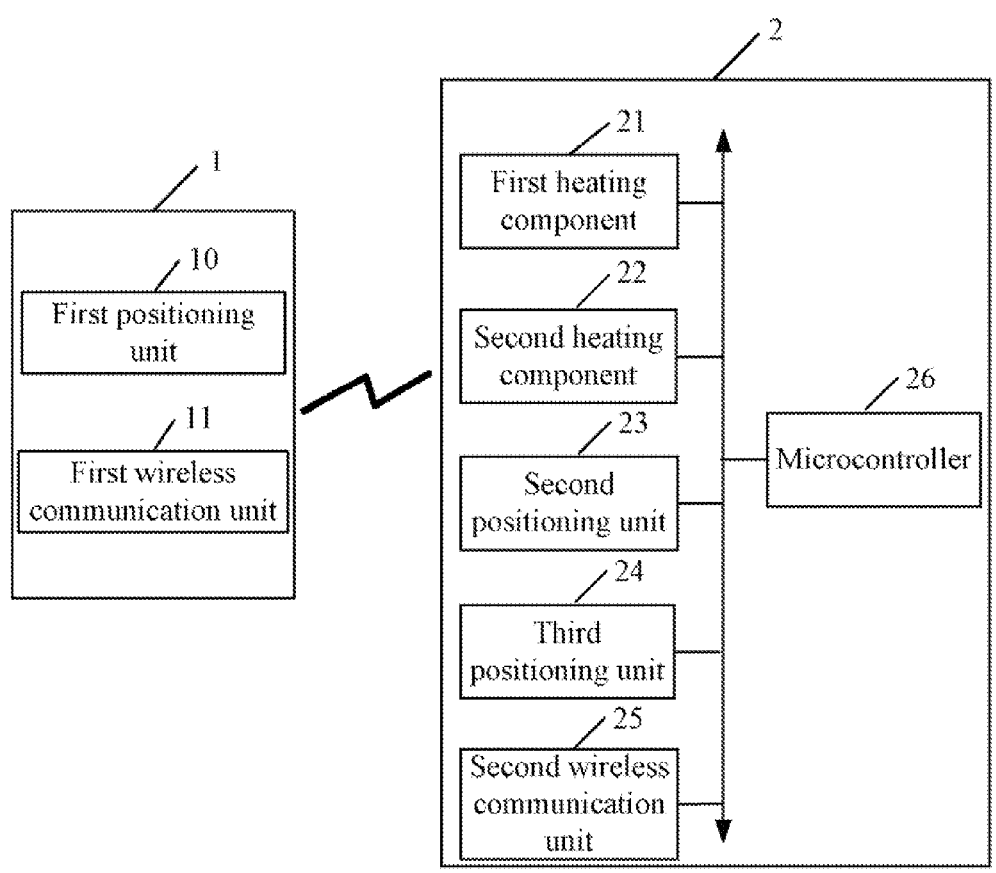
FIG. 1 illustrates a schematic block diagram of one embodiment of an electronic glove in communication with an electronic device.

Referring to FIG. 1, an electronic glove 2 communicates with an electronic device 1 through wireless connection. The electronic device 1 may be, for example, a smart phone, a personal digital assistant (PDA), a portable computer, or other similar device. The electronic device 1 includes a first positioning unit 10 and a first wireless communication unit 11. The electronic glove 2 includes a first heating component 21, a second heating component 22, a second positioning unit 23, a third positioning unit 24, a second wireless communication unit 25, and a microcontroller 26. The first wireless communication unit 11 communicates with the second wireless communication unit 25 using BLUETOOTH® or WIFI® technologies, thereby establishing the communication between the electronic device 1 and the electronic glove 2.

The first positioning unit 10 detects its own location, and transmits first coordinates as to its own location to the electronic glove 2 through the first wireless communication unit 11. In the embodiment, the first coordinates represent coordinates of a location of the electronic device 1

Figure 2:
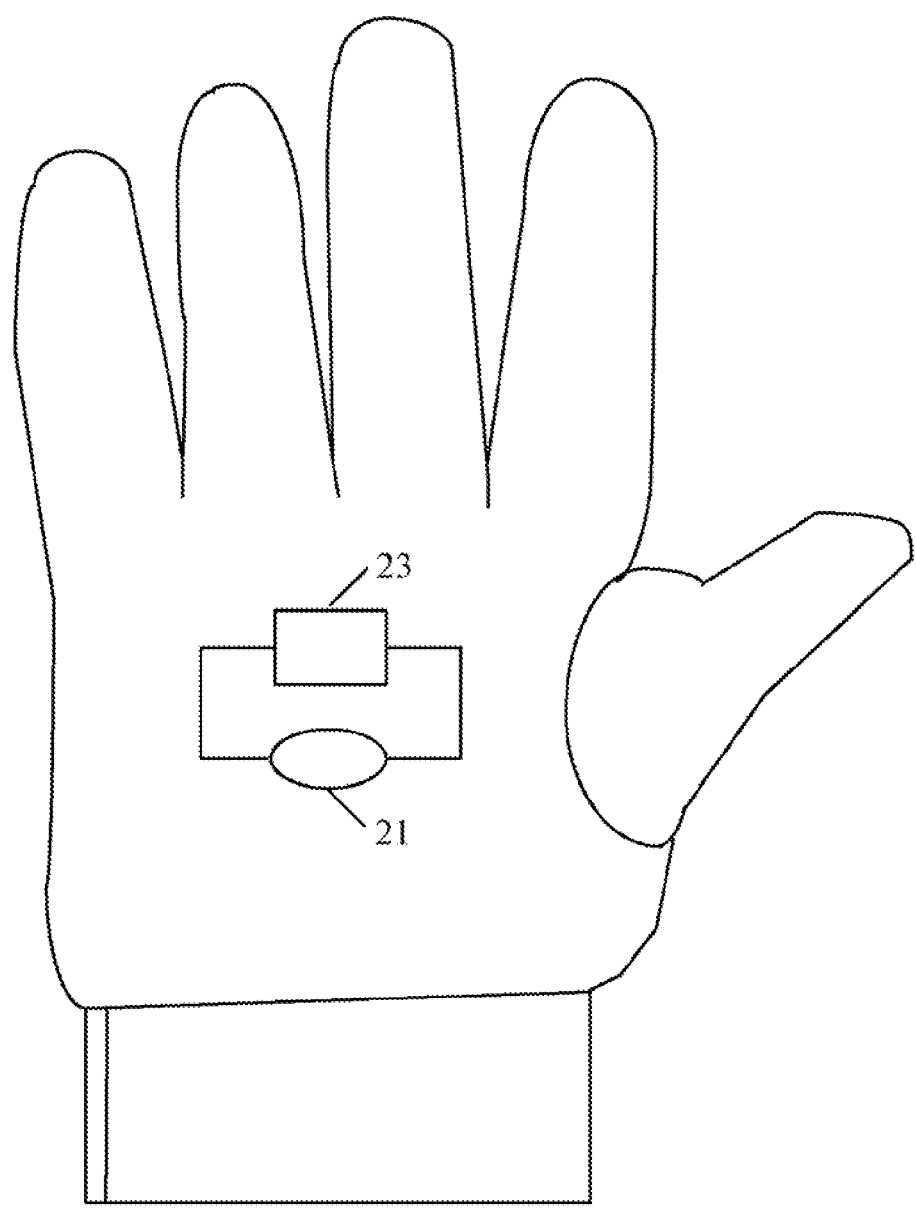
FIG. 2 shows a first heating component and a first positioning unit located at a first surface of the electronic glove of FIG. 1.
Figure 3:
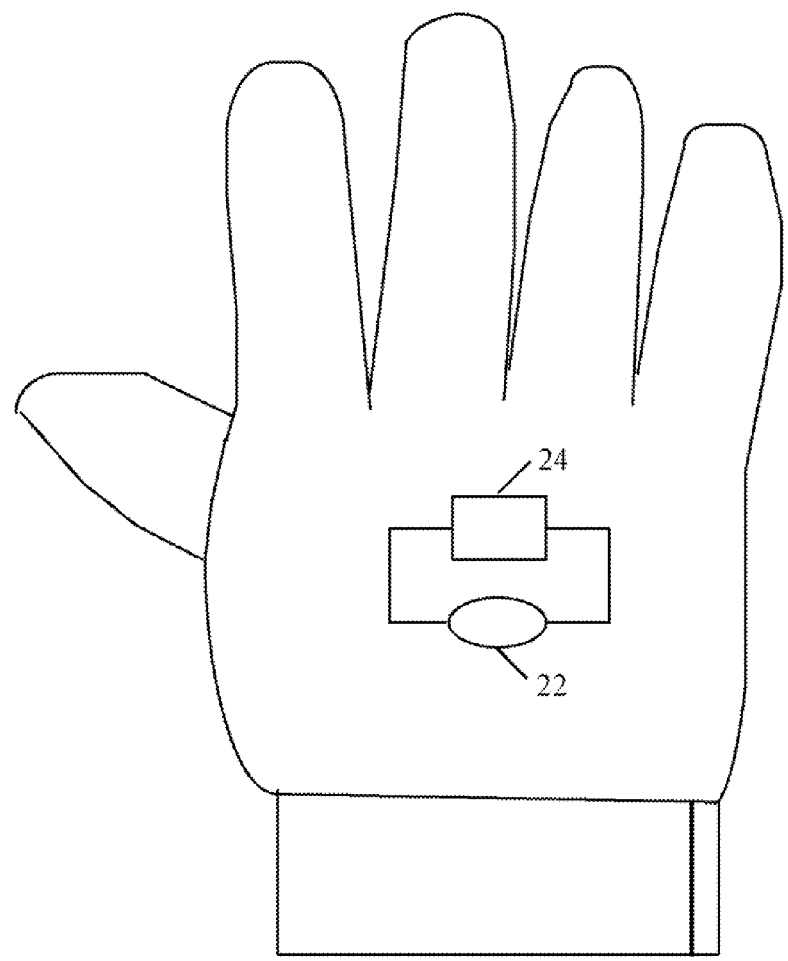
FIG. 3 shows a second heating component and a second positioning unit located at a second surface of the electronic glove of FIG. 1.

Referring to FIG. 2 and FIG. 3, the first heating component 21 and the second positioning unit 23 are installed at a first surface of the electronic glove 2 corresponding to a palm of a user. The second positioning unit 23 is located at a predetermined position of the first surface (e.g., the center of the first surface), to detect second coordinates which represent coordinates of a location of the first surface of the electronic glove 2. The second heating component 22 and the third positioning unit 24 are installed at a second surface of the electronic glove 2 which covers the back of the hand of the user. The third positioning unit 24 is located at a predetermined position of the second surface (e.g., the center of the second surface), to detect third coordinates which represent coordinates of the location of the second surface of the electronic glove 2. In the embodiment, the first, second, and third coordinates are established as three particular coordinates within a predetermined three dimensional coordinates system, such as a spherical coordinates system. The three dimensional coordinates may include, for example, a longitude data, a latitude data, and an altitude data. Each of the first positioning unit 10, the second positioning unit 23, and the third positioning unit 24 may be, for example, a global positioning system (GPS) device, an electronic compass, or other similar component having a location detecting function.

The second wireless communication unit 25 and the microcontroller 26 can be installed at any position of the electronic glove 2 according to requirements. The second wireless communication unit 25 receives the first coordinates transmitted from the first wireless communication unit 11, and transfers the first coordinates to the microcontroller 26 for processing.

The microcontroller 26 is electronically connected to the first heating component 21, the second heating component 22, the second positioning unit 23, the third positioning unit 24 and the second wireless communication unit 25. The microcontroller 26 calculates a first distance between the electronic device 1 and the first surface of the electronic glove 2 and a second distance between the electronic device 1 and the second surface of the electronic glove 2, according to the first, second, and third coordinates. In the embodiment, the first distance is obtained by calculating a dot product of the first and the second coordinates, and the second distance is obtained by calculating a dot product of the first and the third coordinates. Thereupon, the microcontroller 26 may activate one of the first heating component 21 and the second heating component 22, and adjust a temperature of the first heating component 21 or of the second heating component 22 which are activated according to changes in the first distance or in the second distance. The temperature changing of the first heating component 21 or of the second heating component 22 indicates changes in the distance between the electronic device 1 and the electronic glove 2, and thereby guides the user to approach and find the electronic device 1. In the embodiment, when the first distance is less than the second distance, the first heating component 21 is activated. When the first distance is greater than or equal to the second distance, the second heating component 22 is activated.

In an example, upon activation of the first heating component 21, the microcontroller 26 raises the temperature of the first heating component 21 as the first distance decreases, or reduces the temperature of the first heating component 21 as the first distance increases. When the second heating component 22 has been activated, the microcontroller 26 raises the temperature of the second heating component 22 to correspond to a decrease of the second distance, or reduces the temperature of the second heating component 22 to correspond to an increase of the second distance. In the embodiment, the microcontroller 26 adjusts the temperatures of the first heating component 21 and the second heating component 22 by adjusting the flow of current through the first heating component 21 and the second heating component 22. Additionally, when the first distance or the second distance becomes less than a predetermined distance (e.g., 20 or 50 centimeters), the microcontroller 26 turns off the first and second heating components 21, 22, on the basis that they are no longer required.

Figure 4:
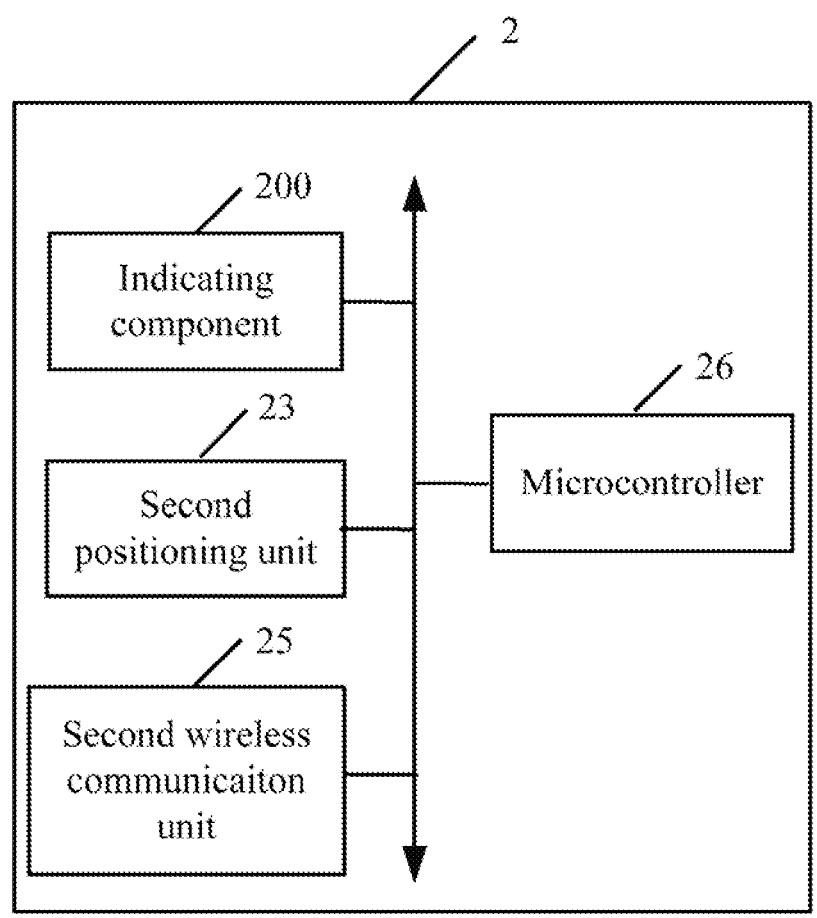
FIG. 4 shows a schematic block diagram of another embodiment of the electronic glove of FIG. 1.

Referring to FIG. 4, another embodiment of the electronic glove 2 is shown. In this embodiment, the first heating component 21 and the second heating component 22 are replaced by an indicating component 200, and the third positioning unit 24 is omitted. In another embodiment, the second positioning unit 23 is omitted, and the third positioning unit 24 is kept.

The indicating component 200 and the second positioning unit 23 can be installed at any appropriate position of the electronic glove 2, for example, the center of the first surface or of the second surface of the electronic glove 2. The second coordinates detected by the second positioning unit 23 represent coordinates of a location of the overall electronic glove 2. The microcontroller 26 is electronically connected to the indicating component 200, the second positioning unit 23 and the second wireless communication unit 25. The microcontroller 26 calculates a distance between the electronic device 1 and the electronic glove 2 according to the first coordinates and the second coordinates, and then controls the indicating component 200 to generate different signals according to changes in the distance between the electronic device 1 and the electronic glove 2, thereby guiding the user to move towards the electronic device 1.

The indicating component 200 may be a heating component (e.g., one of the first heating component 21 and the second heating component 22) or a visual indicating component.

If the indicating component 200 is the heating component, the microcontroller 26 raises the temperature of the heating component to accompany a decrease of the distance between the electronic device 1 and the electronic glove 2, and reduces the temperature of the heating component to accompany an increase of the distance. Then, when the distance becomes less than the predetermined distance, the heating component is turned off.

If the indicating component 200 is the visual indicating component, for example a flashing light indicator, the microcontroller 26 increases the brightness of the light of the visual indicating component or the frequency of the flashing (hereinafter "flashing frequency") of the visual indicating component to accompany a decrease of the distance between the electronic device 1 and the electronic glove 2, and reduces the brightness or the flashing frequency of the visual indicating component to accompany an increase of the distance.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic glove in communication with an electronic device, the electronic device comprising a first positioning unit that detects first coordinates which represent coordinates of a location of the electronic device, the electronic glove comprising:
   a first heating component, a second heating component, a second positioning unit, a third positioning unit, and a microcontroller;
   the first heating component and the second positioning unit being installed at a first surface of the electronic glove corresponding to a palm of a hand of a user, the second positioning unit detecting second coordinates which represent coordinates of a location of the first surface;
   the second heating component and the third positioning unit being installed at a second surface of the electronic glove which covers the back of the hand of the user, the third positioning unit detecting third coordinates which represent coordinates of a location of the second surface;
   the microcontroller being electronically connected to the first heating component, the second heating component, the second positioning unit, and the third positioning unit, calculating a first distance between the electronic device and the first surface and a second distance between the electronic device and the second surface according to the first, second, and third coordinates, activating one of the first heating component and the second heating component, and adjusting a temperature of the first heating component or of the second heating component according to changes in the first distance or in the second distance.

2. The electronic glove according to claim 1, wherein the first heating component is activated when the first distance is less than the second distance, or the second heating component is activated when the first distance is greater than or equal to the second distance.

3. The electronic glove according to claim 1, wherein when the first heating component is activated, the microcontroller raises the temperature of the first heating component as the first distance decreases, or reduces the temperature of the first heating component as the first distance increases; and
   when the second heating component is activated, the microcontroller raises the temperature of the second heating component to correspond to a decrease of the second distance, or reduces the temperature of the second heating component to correspond to an increase of the second distance.

4. The electronic glove according to claim 3, wherein the microcontroller adjusts the temperatures of the first heating component and the second heating component by adjusting a flow of current through the first heating component and the second heating component.

5. The electronic glove according to claim 1, wherein when the first distance or the second distance becomes less than a predetermined distance, the microcontroller turns off the first heating component and the second heating component.

6. The electronic glove according to claim 1, wherein the electronic device further includes a first wireless communication unit, the electronic glove further includes a second wireless communication unit, and the first wireless communication unit communicates with the second wireless communication unit through BLUETOOTH® or WIFI® technology.

7. The electronic glove according to claim 6, wherein the electronic glove receives the first coordinates from the electronic device using the second wireless communication unit.

8. The electronic glove according to claim 1, wherein each of the first positioning unit, the second positioning unit, and the third positioning unit is a global positioning system (GPS) device or an electronic compass.

9. The electronic glove according to claim 1, wherein the first, second, and third coordinates are established as three particular coordinates within a predetermined three dimensional coordinates system.

10. An electronic glove in communication with an electronic device, the electronic device comprising a first positioning unit that detects first coordinates which represent coordinates of a location of the electronic device, the electronic glove comprising:
   a first heating component and a second positioning unit located at a first surface of the electronic glove, the second positioning unit detecting second coordinates which represent coordinates of a location of the first surface;
   a second heating component and a third positioning unit located at a second surface opposite to the first surface of the electronic glove, the third positioning unit detecting third coordinates which represent coordinates of a location of the second surface; and a microcontroller electronically connected to the first heating component, the second heating component, the second positioning unit, and the third positioning unit, calculating a first distance between the electronic device and the first surface and a second distance between the electronic device and the second surface according to the first, second, and third coordinates, and activating one of the first heating component and the second heating component to indicate a location of the electronic device in relation to the electronic glove, wherein the first heating component is activated when the first distance is less than the second distance, and the second heating component is activated when the first distance is greater than or equal to the second distance.

\* \* \* \* \*